United States Patent [19]
Christena et al.

[11] 3,787,282
[45] Jan. 22, 1974

[54] POLYESTERAMIDES PREPARED BY REACTING BETA-PROPIOLACTONE WITH AN AZIRIDINE SALT, A POLYCARBOXYLIC ACID, AND A POLYHYDRIC ALCOHOL

[75] Inventors: Ray C. Christena, Wichita; Earnest L. Johnston, Clearwater; Ronald W. Whobrey, Wichita, all of Kans.

[73] Assignee: Vulcan Materials Company, Birmingham, Ala.

[22] Filed: Oct. 20, 1971

[21] Appl. No.: 190,819

[52] U.S. Cl............ 161/195, 260/18 R, 260/18 N, 260/22 R, 260/75 N, 260/78 R, 260/78 UA, 260/868, 260/869, 260/873
[51] Int. Cl............................................ C08g 20/30
[58] Field of Search.... 260/18 N, 22 R, 75 N, 78 R, 260/78 UA, 868, 869, 873, 18 R, 22 CB; 161/195

[56] References Cited
UNITED STATES PATENTS

| | | | |
|---|---|---|---|
| 3,676,424 | 7/1972 | Christena et al. | 260/75 |
| 3,676,291 | 7/1972 | Christena et al. | 260/75 |
| 2,887,468 | 5/1959 | Caldwell et al. | 260/75 |
| 3,546,178 | 12/1970 | Caldwell et al. | 260/75 |
| 2,463,977 | 3/1949 | Kropa | 260/78 |
| 3,475,385 | 10/1969 | Goodman et al. | 260/75 |
| 3,502,602 | 3/1970 | Helm et al. | 260/22 |
| 3,660,327 | 5/1972 | Loncrini et al. | 260/22 |
| 3,674,727 | 7/1972 | Fekete | 260/22 |
| 2,806,822 | 9/1957 | Ott | 260/2.5 |
| 2,779,701 | 1/1957 | Robitschek et al. | 260/75 |
| 3,262,991 | 7/1966 | McClendon et al. | 260/75 |
| 3,354,126 | 11/1967 | Ham et al. | 260/78 |
| 3,642,712 | 2/1972 | Sambeth et al. | 260/78 |
| 2,946,769 | 7/1960 | Rose et al. | 260/75 |
| 3,422,116 | 1/1969 | Frazer | 260/78 |

Primary Examiner—Donald E. Czaja
Assistant Examiner—Eugene C. Rzucidlo
Attorney, Agent, or Firm—Peter H. Smolka et al.

[57] ABSTRACT

An improved polyesteramide is produced by reacting beta-propiolactone with an aziridine salt represented by the structural formula:

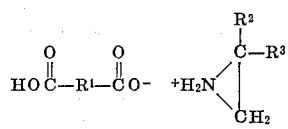

wherein $R^1$ represents a divalent radical such as alkylene, arylene, or aralkylene, wherein one or all of the hydrogen atoms thereof can be substituted with F, Cl, Br, lower alkyl and/or lower alkoxy; and where $R^2$ and $R^3$ represents monovalent radicals such as hydrogen, alkyl, or aryl;

and with a polycarboxylic acid, such as maleic or dimer acid, and with a polyhydric alcohol, such as castor oil or 1,6-hexane diol; the thus formed polyesteramide contains repeating units which may be represented by the structural formula:

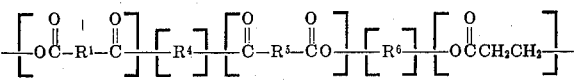

wherein $R^1$ has the meaning given above; $R^4$ represents a divalent radical such as aminoalkyleneoxy or oxyalkyleneamino; $R^5$ represents a divalent radical such as alpha-beta ethylenically unsaturated alkylidene; and $R^6$ represents a divalent radical such as alkylene or alkylidene.

The above aziridine salt may also be reacted with an acid represented by the structural formula

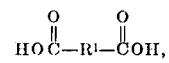

wherein $R^1$ has the meaning given above, to yield a diacid represented by the structural formula

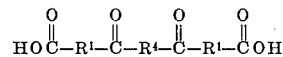

where $R^4$ has the meaning given above. The above diacid may then be reacted with beta-propiolactone, the polycarboxylic acid and the polyhydric alcohol to form an improved polyesteramide containing repeating units which may be represented by the structural formula

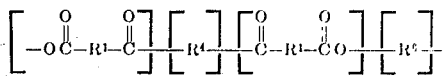

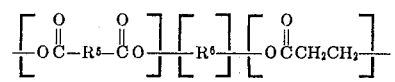

where $R^1$, $R^4$, $R^5$ and $R^6$ have the meanings given above.

10 Claims, No Drawings

POLYESTERAMIDES PREPARED BY REACTING BETA-PROPIOLACTONE WITH AN AZIRIDINE SALT, A POLYCARBOXYLIC ACID, AND A POLYHYDRIC ALCOHOL

BACKGROUND OF THE INVENTION

1. Field of the Invention

This invention relates to polyesteramides.

2. Summary of the Prior Art

Since their discovery, synthetic resins or polymers such as the polyamides, polyesters, and polyesteramides have found application in industries and scientific disciplines in many forms such as coatings, shaped articles and binders. See, for example, U. S. Pat. Nos. 2,463,977, 2,490,001–005, 2,495,172, 2,523,999, 2,806,822, 3,036,974 and 3,354,126; and French Patent No. 1,547,058. However, the search has continued, particularly in the area of glass fiber-reinforced plastic articles, for ways to produce polymers which are resistant to existing and anticipated destructive elements and forces to be encountered in their environments. For example, new ways are needed to produce polymers suitable for use in fire-retardant coatings, and impact resistant glass fiber-reinforced plastic articles such as boat hulls, where adhesiveness or bonding between the glass fibers and the polymer matrix is important.

In three prior copending applications which are assigned to the assignee of the present invention, polyesteramides and processes therefor are described which are useful, for example, in the area of glass fiber-reinforced plastic articles or laminates. In this area, glass fibers are typically mixed or coated with a thermosetting binder composition comprising a thermosetting unsaturated polymer and a vinylic cross-linking agent such as styrene. Desirably, the thermosetting polymer forms a stable solution with styrene for application and storage purposes, and the thermosetting polymer should also have good impact strength after curing. The present invention was made as a result of the search for polyesteramides having improved solubility in vinylic cross-linking agents such as styrene and having improved impact strength after curing.

SUMMARY OF THE INVENTION

Accordingly, a general object of the present invention is to provide polymers having desired characteristics as discussed above.

Another more particular object of the present invention is to provide novel polyesteramides having improved solubility in vinylic cross-linking agents such as styrene.

Another more particular object of the present invention is to provide novel polyesteramides having improved impact strength after curing.

Yet another object of the present invention is to provide processes for the production of these novel polyesteramides.

Another object of the present invention is to provide mixtures of these novel polyesteramides with vinylic cross-linking agents such as styrene.

Another object of this invention is to provide glass fiber-reinforced articles containing a glass fiber binder composition comprising these novel polyesteramides.

Other and more particular objects of the present invention will become apparent to one skilled in the art from the following summary of the the invention and description of the preferred embodiments:

In accordance with one aspect of the present invention, a polyesteramide containing repeating units which can be represented by the structural formula

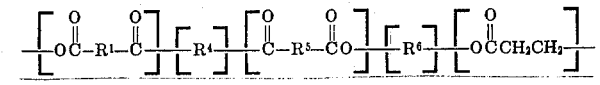

is provided.

In this and in the below given structural formulas, $R^1$ represents a divalent radical which may be alkylene, arylene, or aralkylene, wherein one or all of the hydrogen atoms thereof can be substituted with one or more members selected from the group consisting of F, Cl, Br, lower alkyl and lower alkoxy; $R^2$ and $R^3$ represent monovalent radicals which may independently be selected from the group consisting of hydrogen, alkyl, and aryl; $R^4$ represents a divalent radical which may be aminoalkyleneoxy or oxyalkyleneamino; $R^5$ represents a divalent radical such as alpha-beta ethylenically unsaturated alkylidene, and $R^6$ represents a divalent radical such as alkylene or alkylidene.

In accordance with another aspect of the present invention, a polyesteramide having repeating units which can be represented by the structural formula

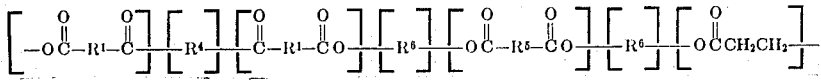

is provided. In this structural formula, $R^1$, $R^4$, $R^5$, and $R^6$ have the meanings given above.

In accordance with another aspect of the present invention, a process is provided for producing polyesteramides. This process involves reacting:

A. at least one member of the group consisting of an aziridine salt which may be represented by the structural formula

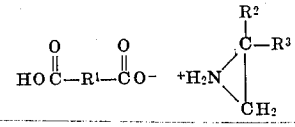

or a diacid which may be represented by the structural formula

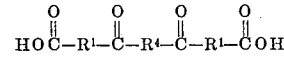

B. a polycarboxylic acid or an acid anhydride thereof;

C. a polyhydric alcohol; and

D. beta-propiolactone.

In accordance with yet another aspect of the present invention, the above process further includes additionally reacting a dicarboxylic acid of the formula HOOCR$^1$COOH.

A primary feature of the above aspects of the present invention is the discovery that the use of beta-propiolactone in the production of these novel polyesteramides results in improved solubility in vinylic cross-linking agents such as styrene and in improved impact strength in the cured polymer.

These and other aspects and advantages of the present invention will be more fully apparent to one skilled in the art from the following description of the preferred embodiments:

DESCRIPTION OF THE PREFERRED EMBODIMENTS

The Aziridine Salt

The aziridine salts which may be used to prepare the polyesteramides may be represented by the general formula:

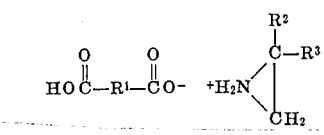

$R^1$ represents a divalent organic radical such as alkylene, arylene, or aralkylene, wherein one or all of the hydrogen atoms thereof can be substituted with one or more members selected from the group consisting of F, Cl, Br, lower alkyl, and lower alkoxy. $R^2$ and $R^3$ represent monovalent organic radicals which are independently selected from the group consisting of hydrogen, alkyl, and aryl. The alkyl and alkylene groups or portions of the groups may contain, for example, from one to 15 carbon atoms.

In one preferred embodiment of the present invention $R^1$ is lower alkylene or phenylene, $R^2$ is hydrogen or methyl and $R^3$ is hydrogen.

In another preferred embodiment of the present invention wherein the salts are especially useful to produce flame retardant polyesteramides as described more completely below, $R^1$ is tetrachlorophenylene, tetrabromophenylene, or a radical represented by the structural formula

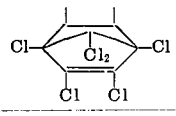

by which is meant the residue of 1,4,5,6,7,7-hexachlorobicyclo[2.2.1]-5-heptene-2,3-dicarboxylic acid commercially available as chlorendic acid under the "Het" Acid trademark of Hooker Chemical Corporation. In this embodiment $R^2$ is hydrogen or methyl and $R^3$ is hydrogen.

The aziridine salts may be produced by co-reacting at least one dicarboxylic acid represented by the general formula:

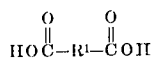

with at least one aziridine compound represented by the general formula:

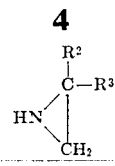

wherein $R^1$, $R^2$ and $R^3$ may have the above described meanings.

The above represented dicarboxylic acids should be free of non-benzenoid unsaturation, in order to inhibit undesirable reactions with the aziridine compound. For example, maleic acid is not within the scope of such acids. And unlike many reactions employing dicarboxylic acids, in this reaction the acid anhydrides are not equivalents and the term "acid" employed in connection with the dicarboxylic acids is meant to refer to the acid containing two carboxyl groups and not to the corresponding anhydride.

Non-limiting examples of suitable dicarboxylic acids include among others malonic acid, succinic acid, glutaric acid, adipic acid, azelaic acid, brassylic acid, phthalic acid, terephthalic acid, isophthalic acid, 1,8-naphthalenedicarboxylic acid, araliphatic dicarboxylic acids such as p,p' benzophenonedicarboxylic acid, and 3-methyl phthalic acid, hemipic acid, 3-bromophthalic acid, 4-chloroisophthalic acid, tetrabromophthalic acid, tetrachlorophthalic acid, and chlorendic acid.

Non-limiting examples of suitable aziridine compounds include among others ethyleneimine (aziridine), 2-methyl aziridine, 2-phenyl aziridine, 2,2-dimethyl aziridine, 2-benzyl aziridine and 2-dodecyl aziridine. Ethyleneimine is preferred because of cost, availability, and reactivity, although 2-methyl aziridine has also been found to be suitable for certain specialized applications.

The reaction between the dicarboxylic acid and the aziridine compound is most conveniently affected by simply adding the aziridine compound to the acid at any convenient temperature, but generally between —20° and 100°C and preferably between 0° and 50°C. At lower temperatures, the reaction proceeds at an uneconomically slow rate whereas at higher temperatures the salt tends to rearrange to an amino ester or hydroxy amide. The reaction is preferably conducted in the presence of a suitable solvent which is inert to the acid and the aziridine compound. Examples of suitable solvents include among others ethanol, methanol, xylene, dioxane, toluene, chlorobenzene, ethylene dichloride, and acetone, which is preferred. The solvent can be present in any amount up to infinite dilution. The aziridine compound is preferably added to the acid in a molar ratio of 10:10 although slightly varying molar ratios such as 10:11 to 11:10 can also be employed. At lower molar ratios insufficient aziridine is present in order to completely convert the acid to the aziridine salt whereas at greater ratios competing side reactions occur undesirably reducing the yield of the salt.

The Diacid HOOCR$^1$COR$^4$COR$^1$COOH

The diacids which may be used to prepare the polyesteramides may be represented by the general formula

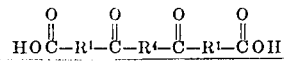

$R^1$ has the meaning given above, and $R^4$ represents a divalent organic radical such as aminoalkyleneoxy or oxyalkyleneamino. The alkylene portions of the groups may contain, for example, from two to 15 carbon atoms.

$R^1$ is preferably tetetrachlorophenylene, tetrabromophenylene, or the radical represented by the structural formula

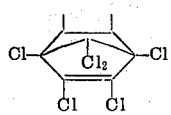

In this embodiment, $R^4$ is preferably aminoethylenoxy, oxyethyleneamino, aminoisopropyleneoxy or oxyisopropyleneamino, i.e., $R^4$ may be represented by the general formulas

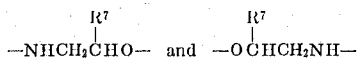

where $R^7$ is hydrogen or methyl. In the most preferred embodiment, $R^4$ is aminoethyleneoxy or oxyethyleneamino, i.e., $R^7$ is hydrogen.

The diacid is preferably produced by coreacting at least one of the above discussed aziridine salts with at least one of the above discussed dicarboxylic acids represented by the general formula $HOOCR^1COOH$.

The reaction between the aziridine salt and the dicarboxylic acid is most conveniently effected by simply adding or mixing the aziridine salt with the dicarboxylic acid at any convenient temperature at which the reaction proceeds at a measurable rate. Typically, this temperature is between about 0° and 200°C, preferably between about 40° and 180°C. The reaction may be conducted in the presence of a suitable solvent which is inert to the aziridine salt and the dicarboxylic acid. Examples of suitable solvents include among others toluene, dioxane, xylene and acetone. The solvent may be present in any amount up to infinite dilution. The aziridine salt is preferably reacted with the carboxylic acid is substantially stoichiometric proportions, i.e., at a molar ratio of 10:10, although slightly varying molar ratios such as 10:11 to 11:10 may also be employed.

The Polycarboxylic Acid or Anhydride thereof

As indicated above, in the present invention there is provided an improved process for producing polyesteramides comprising coreacting the aziridine salt and/or the diacid with at least one polyhydric alcohol, beta-propiolactone, and at least one polycarboxylic acid or polycarboxylic acid anhydride thereof.

In the broadest aspect of the present invention any polycarboxylic acid or anhydride thereof can be employed. However, dicarboxylic acids and anhydrides thereof are preferred when it is desired to produce linear polyesteramides. Examples of certain dicarboxylic acids free of non-benzenoid unsaturation are given above. Their corresponding anhydrides such as phthalic anhydride can also be employed. In an especially preferred embodiment of the present invention, the dicarboxylic acid or anhydride is alpha-beta ethylenically unsaturated in order to render the polyesteramide cross-linkable with a vinyl monomer. Examples of suitable alpha-beta unsaturated dicarboxylic acids include among others glutaconic acid, itaconic acid, citraconic acid, mesaconic acid, fumaric acid and maleic acid which is preferred. Dimer acid, typically produced by dimerization of unsaturated fatty acids at mid-molecule and usually containing 36 carbon atoms, may also be used, particularly in combination with maleic acid or anhydride, and particularly where even further improvement in impact strength of the resulting polyesteramide is desired. Tri- or higher functional acids such as trimesic acid can be employed when it is desired to produce a branched or cross-linked polyesteramide.

The Polyhydric Alcohol

In the broadest aspects of the present invention, any polyhydric alcohol can be employed although the dihydric alcohols are preferred when it is desired to produce linear polyesteramides.

Typically, the dihydric alcohols have from two to six carbon atoms.

Examples of suitable polyhydric alcohols include among others ethylene glycol, diethylene glycol, 1,2-propylene glycol, dipropylene glycol, 1,3-propylene glycol, 1,3-butylene glycol, 1,2-butylene glycol, neopentyl glycol, 1,3-pentanediol, 1,2-butenediol, 1,5-pentanediol, and 1,6-hexanediol. Particularly preferred are the alkanediols of from 5 to 6 carbon atoms, insofar as the longer chain diols have been found to give improved impact strength. Higher polyhydric alcohols such as trimethylol propane and pentaerythritol can be used in minor amounts which do not materially alter the linear nature of the polyesteramide.

Castor oil, which is chiefly ricinolein, is another polyhydric alcohol which may be used, and can be especially advantageous where even further improvement in impact strength of the resulting polyesteramide is desired.

Beta-Propiolactone

As indicated above, beta-propiolactone is used in the present invention for the production of polyesteramides. Of course, beta-propiolactone,

is well known per se and its production or derivation is not part of the present invention.

Polyesteramide Production

The following generalized equation illustrates the reaction which is thought to occur in forming a polyesteramide by reacting the aziridine salt, an alpha, beta-unsaturated dicarboxylic acid, a dihydric alcohol and beta-propiolactone:

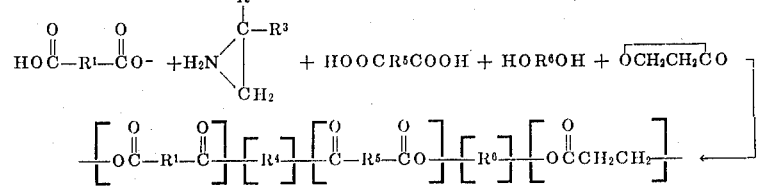

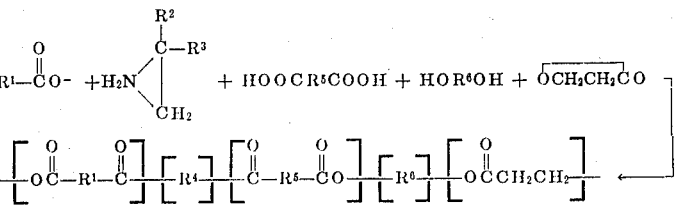

$R^1$, $R^2$, $R^3$ and $R^4$ have the meanings given above; $R^5$ represents a divalent organic radical such as alpha-beta ethylenically unsaturated alkyldene; and $R^6$ represents a divalent organic radical such as alkylene or alkylidene.

Preferably, $R^5$ is a divalent organic radical represented by the formula

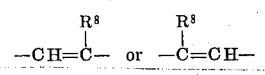

where $R^8$ is hydrogen or lower alkyl, preferably methyl. $R^8$ is most preferably hydrogen.

Preferably, $R^6$ is lower alkylene or lower alkylidene.

The following generalized equation illustrates the reaction which is thought to occur in forming a polyesteramide by reacting the aziridine salt, a dicarboxylic acid $HOOCR^1COOH$ (which together are thought to react in situ to form the diacid $HOOCR^1COR^4COR^1COOH$), an alpha, beta-unsaturated dicarboxylic acid $HOOCR^5COOH$, a dihydric alcohol $HOR^6OH$, and beta-propiolactone;

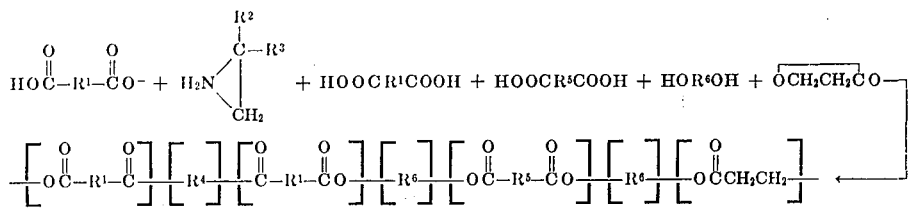

$R^1$, $R^2$, $R^3$, $R^4$, $R^5$ and $R^6$ have the meanings given above.

The brackets in the above formulas are meant to indicate a linear polymer having recurring ester and amide linkages in the backbone thereof. The brackets are not meant to indicate that the reactants which produce these recurring units must necessarily be present in the most preferred equimolar ratio.

The polyesteramides are produced by combining the coreactants in a reaction vessel and heating it to any temperature at which the reaction proceeds at an economical rate. This is generally between zero and 200° C and preferably between 40° and 180° C. When it is desired to achieve a high molecular weight, the ratio of the polycarboxylic acid to the polyhydric alcohol may be critical and generally is between 15:10 and 10:15 and preferably between 11:10 and 10:11. The aziridine salt and the diacid $HOOCR^1COR^4COR^1COOH$ may be employed in somewhat more widely varying molar ratios, but are generally present in a molar ratio of 10:1 to 1:10 and preferably 3:1 to 1:3 moles of salt or diacid per mole of dicarboxylic acid $HOOCR^5COOH$. The molar ratio of beta-propiolactone to aziridine salt or diacid may range from about 10;100 to 100:10, more typically from about 10:20 to 20:10, and preferably from about 10:15 to 15:10. In that preferred embodiment of the present invention wherein the polyesteramides are intended to be self-extinguishing, a salt of a chlorinated or brominated acid is employed in an amount such that the total polyesteramide or its mixture with a vinyl monomer has a halogen content of greater than 10 weight percent and preferably greater than 20 weight percent. The reactants can be charged sequentially to the vessel but advantageously may be charged simultaneously in order to produce a random polyesteramide and maximize molecular weight, thus resulting in greater impact strength for the polyesteramide. When the reactants are not charged simultaneously, the diacid $HOOCR^1COR^4COR^1COOH$ is preferably used in lieu of the aziridine salt, and most preferably is generated or produced in situ from the aziridine salt, so as again to maximize molecular weight and impact strength. The use of the diacid, either by generating it in situ or by adding it directly to the reaction zone has also been found to improve color and storage stability of the resulting polyesteramides. The reaction is continued until a stoichiometric amount of water has been removed or more preferably until the acid number of the reaction mixture has dropped to a value below 100 and preferably below 50 and also until the amine number of the reaction mixture has dropped to a value below 20 and preferably below 10.

The reaction is usually conducted in the presence of an inert atmosphere of nitrogen, argon or the like, under substantially oxygen-free conditions, i.e., an atmosphere containing less than 20 ppm oxygen and preferably less than 10 ppm oxygen. The reaction is conveniently conducted at atmospheric pressure, but if desired may be conducted at superatmospheric or subatmospheric pressures, and in a batch, semi-continuous, or continuous manner.

Polyesteramides produced in accordance with that preferred embodiment of the present invention employing an alpha-beta ethylenically unsaturated acid can be cross-linked with copolymerizable vinyl monomers, sometimes referred to as vinylic cross-linking agents.

Examples of suitable vinyl monomers include among others vinyl toluene, acrylic acid, methyl acrylate, 2-ethylhexyl acrylate, acrylonitrile, methyl methacrylate, n-butyl acrylate, mono-chlorostyrene, ethyl acrylate, ethyl methacrylate, acrolein, vinyl acetate, vinylidene chloride, vinyl chloride, vinyl bromide, and styrene which is preferred because of costs, availability and reactivity and the fact that it does not adversely affect the physical properties of cured compositions of these polyesteramides. The polyesteramide and the vinyl monomer can be mixed in widely varying weight ratios such as 1:10 to 10:1 but are preferably combined in ratios of 3:1 to 1:3. In a preferred embodiment of the present invention wherein the mixture of polyesteramide and vinyl monomer when cured must be flame retardant the polyesteramide and the vinyl monomer are mixed in a quantity such that the halogen content of the mixture is greater than 10 and preferably greater than 20 weight percent.

In order to assist in the maintenance of the stability of the mixture of the polyesteramide and vinyl monomer, a conventional free radical trap such as hydroquinone may be used. In order to cure these compositions, a free radical initiator such as benzoyle peroxide, methyl ethyl ketone peroxide or azobisisobutyronitrile is added to the mixture. Accelerators such as cobalt naphthenate can also be employed as is well known in the art.

The polyesteramides of the present invention especially when mixed with the above-described vinyl monomers provide a cross-linkable compositions which, in view of its "wetting" ability and adhesiveness, and resulting impact strength, is especially useful in adhesives and coatings, and as binders for the bonding of glass fibers and glass fiber laminates in glass fiber-reinforced shaped articles. When so used, it provides an effective substitute for polyester resins commonly employed for such purposes in the past.

It will also be apparent that various modifying agents such as fillers, e.g., carbon black, talc, etc. as well as heat and light stabilizers, dyes, and pigments may be incorporated into the polyesteramides without departing from the scope of the invention.

"Amine Number" is used herein to refer to the value determined as follows:

Weigh out 1 to 2 g of polyesteramide in 200 ml Erlenmeyer flask. Add approximately 50 ml glacial acetic acid and dissolve sample. Titrate with 0.1 N $HClO_4$ using one drop of one percent crystal violet in glacial acetic acid as indicator. Titrate to first permanent green color. Amine Number = [10.046 (ml 0.1 N $HClO_4$)]/[Grams Sample]

"Acid Number" is used herein to refer to the value determined as follows:

Weigh out 1 to 2 g of polyesteramide in 200 ml Erlenmeyer flask with 25 ml acetone. Titrate with 0.1 N Alcoholic KOH using phenolphthalein indicator.

Acid Number = [5.61 (ml 0.1 N Alcoholic KOH)]/[Grams Sample]

The invention is further illustrated by the following examples; all ratios, parts and percentages in the examples, as well as in other parts of the specification and claims, are by weight unless otherwise indicated. These non-limiting examples are illustrative of certain embodiments designed to teach those skilled in the art how to practice the invention and to represent the best mode contemplated for carrying out the invention.

EXAMPLE I

This example illustrates the synthesis of a salt of the formula

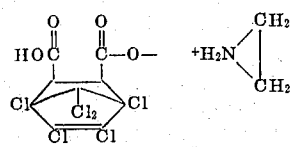

To a three-neck, 2-liter flask equipped with stirrer, thermometer, dropping funnel, and cooling bath was added 388.87 g (1.00 mole) of chlorendic acid in 1200 ml very dry acetone. To the above was added 43.07 g (1.00 mole) of ethylenimine dropwise at such a rate that the temperature was 16°-20°C. When about half the ethylenimine was added, the solid salt started to precipitate out. After all evidence of exotherm disappeared, the solids were filtered off and air dried at room temperature in a hood, follwed by drying in a vacuum oven at ambient temperature to give a white solid, m.p. 149°-150°C yield 98.9 percent.

Amine equivalent - calcd. for $C_{11}H_9Cl_6NO_4$:—431.91
found: — 434
Carboxyl equivalent - calcd. for $C_{11}H_9Cl_6NO_4$: — 215.95
found: — 213

The salt was stored at 5°C to prevent gradual rearrangement to the mono-2-aminoethyl chlorendate.

EXAMPLE II

This example illustrates the synthesis of a salt of the formula

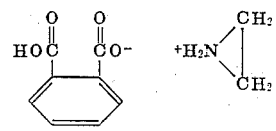

Using equipment as in Example I, 332.3 g (2 moles) phthalic acid and 2900 ml very dry acetone were charged to a pot. To this was added 86.1 g (2 moles) ethylenimine, dropwise at 16°-20°C. The reaction mixture was filtered to give a white solid after air and vacuum drying, at ambient temperature m.p. 94°-95°C, yield 95.7 percent.

Amine equivalent - calcd. for $C_{10}H_{11}NO_4$: — 209.20
found: — 210.50
Carboxyl equivalent - calcd. for $C_{10}H_{11}NO_4$: — 104.60
found: — 102.40

EXAMPLE III

This example illustrates the synthesis of a salt of the formula

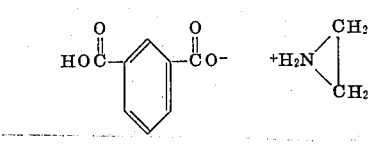

Using equipment as in Example I, 332.3 g (2 moles) of isophthalic acid was mixed with 2500 ml dry acetone and 500 ml dry methanol. To this was added 86.1 g (2 moles) ethylenimine dropwise at 16° - 20°C. The reaction mixture was filtered to give a white solid after ambient temperature air and vacuum drying, m.p. 100° - 160°C.

Amine equivalent - calcd. for $C_{10}H_{11}NO_4$: — 209.20
found: 209.20
Carboxyl equivalent - calcd. for $C_{10}H_{11}NO_4$: — 104.60
found: — 107.40

The above salt contained a substantial amount of impurities due to poor solubility of isophthalic acid in the acetone methanol mixture as indicated by large melting point range.

EXAMPLE IV

This example illustrates the synthesis of a salt of the formula

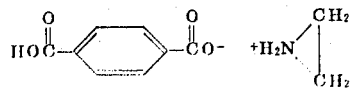

Using equipment as in Example I, 332.3 g (2 moles) of terephthalic acid was slurried with 2500 ml dry acetone and 500 ml dry methanol. To this was added 86.1 g (2 moles) ethylenimine, dropwise at 16° - 20°C. The reaction mixture was filtered to give a white solid after ambient temperature air and vacuum drying, m.p. 184° - 210°C.

Amine equivalent - calcd. for $C_{10}H_{11}NO_4$: — 209.20
 found: — 234.9
Carboxyl equivalent - calcd. for $C_{10}H_{11}NO_4$: — 104.60
 found: — 109.20

The above salt contained a substantial amount of impurities due to poor solubility of the acid in the acetone-methanol mixture as indicated by the large melting point range.

EXAMPLE V

This example illustrates the synthesis of a salt of the formula

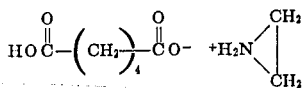

Using equipment as in Example I, 77.24 g (0.52 mole) adipic acid was dissolved in 600 ml dry acetone. To this was added 22.76 g (0.52 mole) ethylenimine, dropwise at 17° – 23°C. The reaction mixture was filtered to give a white solid after ambient temperature air and vacuum drying, m.p. 68.5° – 69.0°C, yield 94.4 percent.

Amine equivalent - calcd. for $C_8H_{15}NO_4$: — 189.21
 found: — 196.85
Carboxyl equivalent - calcd. for $C_8H_{15}NO_4$: — 94.60
 found: — 96.65

EXAMPLE VI

This example illustrates the synthesis of a salt of the formula

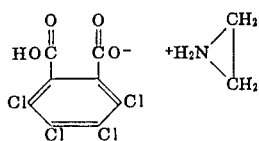

Using equipment as in Example I, 312.93 g (1 mole) of tetrachlorophthalic acid hemihydrate was dissolved in 1750 ml dry acetone. To this was added 43.07 g (1 mole) ethylenimine, dropwise at 17° – 20°C. The reaction mixture was filtered to give a white solid after ambient temperature air and vacuum drying, m.p. 120° – 124°C.

Amine equivalent - calcd. for $C_{10}H_8NO_{4.5}$: — 356.0
 found: — 352.0
Carboxyl equivalent - calcd. for $C_{10}H_8NO_{4.5}$: — 178.0
 found: — 187.5

EXAMPLE VII

This example illustrates the synthesis of a salt of the formula

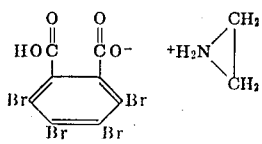

The procedure of Example VI is repeated employing the same conditions, times and ingredients except that the tetrachlorophthalic acid hemihydrate is replaced by an equimolar amount of tetrabromophthalic acid hemihydrate.

EXAMPLE VIII

Preparation of a Polyesteramide Using the Mono Salt of Chlorendic Acid and Ethylenimine, Additional Chlorendic Acid; Maleic Anhydride; 1, 6-Hexane Diol; Propylene Glycol; and Beta-Propiolactone Preparation of the polyesteramide was accomplished in a conventional reactor equipped with thermometer, stirrer, full condenser, partial condenser to contain glycol vapors, nitrogen sparge and source of vacuum.

The general procedure used to prepare the polyesteramide was to charge the diol, the glycol, and maleic anhydride to the reactor along with xylene as an azeotroping agent. After commencement of stirring and gradual heating, chlorendic acid, beta-propiolactone and the salt were added in that order, and reaction was evidenced by a rapid exotherm after which stage all materials were in liquid form. With the temperature further elevated, water was azeotropically distilled over as the reaction proceeded. Vacuum was then applied to remove excess glycol, remaining water and xylene. After this, vacuum was removed; the product was cooled and styrene and inhibitor was added to give a 60 – 85 percent solution of the polyesteramide in styrene. The final liquid product could be cured to a solid at elevated temperature using a free radical curing agent such as benzoyl peroxide or at room temperature using cobalt napthenate and methyl ethyl ketone peroxide.

The specific procedure was as follows: To the reactor, using a nitrogen blanket, was charged 139.20 g (1.17 moles) 1,6-hexane diol, and 29.90 g (0.39 moles) propylene glycol along with 102.70 g (1.04 moles) of maleic anhydride, in xylene. Stirring and heating were commenced and, after a 30-minute period, 203.60 g (0.52 moles) chlorendic acid were added at 70°C. After allowing the temperature to rise to 132°C, the reactor contents were cooled to 50°C and 26.00 g (0.36 moles) beta propiolactone were added followed by addition of 226.10 g (0.52 moles) chlorendic acid-ethylenimine salt at 75°C. Exotherming occurred and stirring was continued over a six-hour period as the temperature rose to a maximum of 166°C. Vacuum (5 mm) was applied and any remaining water, glycol, and xylene distilled over. Vacuum was removed, and at about 160°C, the molten resin was transferred to 270 g styrene containing 135 mg monotertiary butylhydroquinone yielding 934 g of a 71.10 percent solution of the polyesteramide in styrene.

A sample was cured using 0.3 percent cobalt naphthenate and 1.7 percent Lupersol DDM methyl ethyl ketone peroxide solution (60 percent methyl ethyl ketone peroxide in dimethyl phthalate). Final Acid Number was 30.0; Final Amine Number was 2.1; Molecular Weight was 1466; and Impact (2 lb. wt.) was 43 inches. Using 0.3 percent cobalt naphthenate and 1.0 percent Lupersol DDM methyl ethyl ketone peroxide solution gave an impact of 26 inches to a cured sample after 16 hours cure at about 25°C.

It was noted that no precipitate formed in the polyesteramide styrene solution on standing at about 25°C as was observed in comparable runs which were conducted without using beta-propiolactone. This improved resin solubility in styrene is thought to be attributable to the beta-propiolactone. Further, the molecular weight and impact values were also higher than was observed in comparable runs which were conducted without using beta-propiolactone.

EXAMPLE IX

Preparation of a Polyesteramide Using the Mono Salt of Chlorendic Acid and Ethylenimine; Maleic Anhydride; 1, 6-Hexane Diol; and Beta-Propiolactone Using the apparatus and general procedure as in Example VIII, 157.02 g (1.32 moles) 1,6-hexane diol and 124.08 g (1.26 moles) maleic anhydride were charged under a nitrogen blanket to 250 ml xylene in the reactor. With heating and stirring the temperature rose to 72°C over a one-hour period. The temperature was reduced to 35°C and 45.60 g (0.63 moles) beta-propiolactone added. With continued heating the temperature rose to 101°C over a two-hour period. At this point 273.30 g (0.63 moles) chlorendic acid-ethylenimine salt were added. With further reaction, the temperature rose to 164°C over a five-hour period. Vacuum (6mm) was applied and any remaining water, glycol, or xylene was distilled over. Vacuum was removed and, at about 160°C, the molten resin was transferred to 260 g styrene containing 172 mg toluohydroquinone yielding 828 g of a 70.00 percent solution of the polyesteramide in styrene.

A sample was cured for 67 hours at about 25°C using 0.2 percent cobalt naphthenate and 3.0 percent Lupersol DDM methyl ethyl ketone peroxide solution. Final Acid Number was 35.0; Final Amine Number was 4.0; Molecular Weight was 1165; and Impact (2 lbs), was 23 inches.

EXAMPLE X

Preparation of a Polyesteramide Using the Mono Salt of Chlorendic Acid and Ethylenime; Maleic Anhydride; Propylene Glycol; and Beta-Propiolactone Using the apparatus and general procedure as in Example VIII, 115.3 g (1.17 moles) maleic anhydride and 89.52 g (1.29 moles) propylene glycol were charged under a nitrogen blanket to the reactor. The mixture was heated with stirring for one hour at 78°C. At 60°C, 56.52 g (0.78 moles) beta-propiolactone was added. The temperature rose to 82°C over a 1½ hour period. At this point, 338.64 g (0.64 moles) chlorendic acid-ethylenimine salt were added. With further reaction, the temperature rose to 158°C over a five-hour period. Vacuum (5 mm) was applied and any remaining glycol and water distilled over. Vacuum was removed and, at about 160°C, the molten resin was transferred to 257 g styrene containing 172 mg toluohydroquinone yielding 830 g of a 70.00 percent solution of the polyesteramide in styrene.

A sample was cured for 48 hours at about 25°C using 0.2 percent cobalt naphthenate and 3.00 percent Lupersol DDM methyl ethyl ketone peroxide solution. Final Acid Number was 35.8; Final Amine Number was 4.1; Molecular Weight was 1180; and Impact (2 lb), was eight inches. A similar resin made with no beta-propiolactone would have a molecular weight in the range of 650–800. Impact would be two to three inches.

EXAMPLE XI

Preparation of a Polyesteramide Using the Mono Salt of Chlorendic Acid and Ethylenimine; Maleic Anhydride; Castor Oil; and Beta-Propiolactone Using the apparatus and general procedure as in Example VIII, 261.18 g (0.28 moles) castor oil (Baker U.S.P.) and 55.20 g (0.56 moles) maleic anhydride were charged under a nitrogen blanket to the reactor. With heating and stirring, the temperature rose to 92°C over a 1½ hour period. The temperature was lowered to 34°C and 40.56 g (0.56 moles) beta-propiolactone added. Reaction was continued for 1½ hours at 78°C. At this time, 243.06 g (0.56 moles) chlorendic acid-ethylenimine salt were added. The temperature rose to 176°C maximum over a reaction time of three hours. Vacuum (6 mm) was applied and any remaining water, glycol, or xylene distilled over. Vacuum was removed and, at about 175°C, the molten resin was transferred to 116 g styrene containing 143 mg toluohydroquinone yielding 593 g of an 84.00 percent solution of the polyesteramide in styrene.

A sample was cured using 0.2 percent cobalt naphthenate and 3.00 percent Lupersol DDM methyl ethyl ketone peroxide solution. Final Acid Number was 30.2; Final Amine Number was 3.0; Molecular Weight was 1270; and Impact (2 lbs) was 35 inches. The impact data was obtained by allowing the sample to cure for six days at about 25°C. Alternatively, curing may be effected by heating the sample at, for example, 107°C for 45 minutes.

EXAMPLE XII

Preparation of a Polyesteramide Using the Mono Salt of Chlorendic Acid and Ethylenimine; Maleic Anhydride; Propylene Glycol; Castor Oil; and Beta-Propiolactone Using the apparatus and general procedure as in Example VIII, 109.50 g (1.43 moles) propylene glycol, 445.65 g (0.48 moles) castor oil (Baker U.S.P.) and 211.80 g (2.15 moles) maleic anhydride were charged under a nitrogen blanket to the reactor. With heating and stirring, the temperature rose to 108°C over a 1½ hour period. The temperature was lowered to 50°C and 111.00 g (1.54 moles) beta-propiolactone added. Finally, 622.05 g (1.44 moles) chlorendic acid-ethylenimine salt were added. With further reaction, the temperature rose to 165°C over a period of eight hours. Vacuum was applied and, at about 165°C, the molten resin was transferred to 496 g styrene containing 399 mg toluohydroquinone yielding 1940 g of 75.15 percent solution of the polyesteramide in styrene.

A sample was cured for 48 hours at room temperature using 0.2 percent cobalt naphthenate and 1.00 percent Lupersol DDM methyl ethyl ketone peroxide solution. Final Acid Number was 41.0; Final Amine Number was 3.8; Molecular Weight was 996; and Impact (2 lbs) was 15 inches.

EXAMPLE XIII
Preparation of a Polyesteramide Using the Mono Salt of Chlorendic Acid and Ethylenimine; Maleic Anhydride; 1,6-Hexane Diol; Propylene Glycol; and Beta-Propiolactone Using the apparatus and general procedure as in Example VIII, 409.10 g (4.17 moles) maleic anhydride, 386.70 g (3.27 moles) 1,6-hexane diol, and 84.18 g (1.10 moles) propylene glycol were charged under a nitrogen blanket to the reactor. Heating and stirring were commenced and the temperature rose to 106°C over a 1¼ hour period. The temperature was lowered to 68°C and 75.17 g (1.04 moles) beta-propiolactone added. Immediately, 900.59 g (2.08 moles) chlorendic acid-ethylenimine salt were added. Further reaction was continued and the temperature rose to a maximum of 164°C over an eight hour period. Vacuum (7 mm) was applied and, at about 160°C, the molten resin was transferred to 1000 g styrene containing 830 mg benzoquinone, 138 mg tertiary butyl catechol, and 138 mg methyl ether of hydroquinone yielding 2620 g of a 61.82 percent solution of the polyesteramide in styrene.

A sample was cured at about 25°C for 48 hours using 0.4 percent cobalt naphthenate and 2.0 percent Lupersol DDM methyl ethyl ketone peroxide solution. Final Acid Number was 26.0; Final Amine Number was 6.3; Molecular Weight was 1358; and Impact (2 lbs), was 15 inches.

EXAMPLE XIV
Fiber Glass Laminates Made with Polyesteramides

The polyesteramide made in Example VIII is used as the binder in 12 inches × 12 inches × ⅛ inch fiber glass laminates. One laminate is made using 12 plies of type 181 glass cloth treated with methacrylatochromic chloride in isopropanol (DuPont's "Volan A"). Another laminate is made using 12 plies of untreated type 181 glass cloth. The laminates are prepared by the hand lay-up method. Curing of the resin is accomplished with 2.5 percent Lupersol DDM initiator (60 percent methyl ethyl ketone peroxide in dimethyl phthalate) and 0.3 percent "Uversol Cobalt Liquid 6 Percent", and is effected at about 25°C in a press at 460 psi for 16 hours, followed by a post cure for eight hours in an oven at 150°F.

It has been observed in our work that qualitatively polyesteramides have good adhesion to glass. Generally, polyesters do not have good adhesion except to specially treated glass coated with a coupling agent such as DuPont's Volan A.

Comparison

This comparative run illustrates the synthesis of the ethyleneimine salt of oxalic acid of the formula:

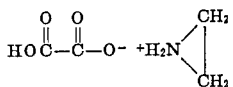

The preparation of the salt of the above formula has been known since before the turn of the century and is described in 28 Berichte 2929 (1895).

Using the general procedure of Example I, 270.12 grams (3.00 moles) anhydrous oxalic acid was dissolved in 3000 ml dry acetone. To this solution was added 129.21 grams (3.00 moles) ethyleneimine, dropwise at 15°–19°C. After complete reaction, the solid reaction product was filtered off and dried at room temperature in a hood to give a white solid, mp 102–103.5 with foaming, in a 98.2 percent yield.

Amine equivalent — calculated for $C_4H_7NO_4$—133.11
found — 134.10
Carboxyl equivalent — calculated for $C_4H_7NO_4$—66.55
found — 73.13

The salt was then used to synthesize a polyesteramide. This polyesteramide has the undesirable property of being insoluble in styrene.

Using the reactor and general procedure described in Example VIII, 205.04 grams (1.54 moles) of the salt, 151.04 grams (1.54 moles) of maleic anhydride, 123.04 grams (1.62 moles) propylene glycol and 250 ml xylene, were charged to the reactor. Using a nitrogen blanket the reactor was heated to 119°C with exotherming over a 90 minute period. Heating was continued to 155°C over a three hour period, at which time vacuum (6 mm Hg) was applied and the remaining glycol, water and xylene distilled over. After 45 minutes the vacuum was removed and provisions were made to transfer the molten polyesteramide into a styrene solution containing 140 mg toluhydroquinone (200 ppm THQ). Upon attempting to dissolve the polyesteramide in styrene it was found that the polyesteramide was totally insoluble in styrene at all temperatures up to 120°C. At this temperature, attempts to effect solution were terminated.

The insolubility of this polyesteramide in styrene renders it useless in the preparation of styrene cross-linked polyesteramides.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

We claim:
1. A polyesteramide containing repeating units represented by the structural formula:

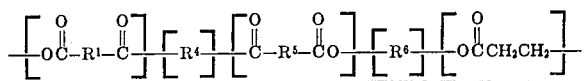

wherein $R^1$ is selected from the group consisting of alkylene of up to 15 carbon atoms, arylene of up to 12 carbon atoms, and aralkylene of up to 13 carbon atoms, wherein one or all of the hydrogen atoms thereof can be substituted with F, Cl, Br, lower alkyl and/or lower alkoxy; and wherein $R^4$ is aminoalkyleneoxy or oxyalkyleneamino wherein the alkylene portions contain from two to 15 carbon atoms;

$R^5$ is alpha-beta ethylenically unsaturated alkylidene; and $R^6$ is alkylene or alkylidene.

2. A polyesteramide according to claim 1 wherein:
$R^1$ is tetrachlorophenylene, tetrabromophenylene or

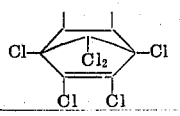

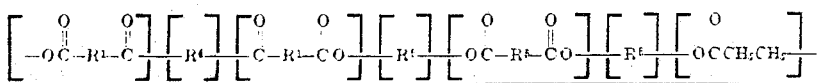

R⁴ is

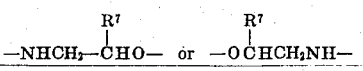

wherein $R^7$ is hydrogen or lower alkyl;
$R^5$ is

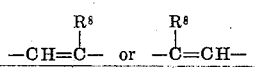

wherein $R^8$ is hydrogen or lower alkyl; and
$R^6$ is lower alkylene or lower alkylidene.

3. A polyesteramide according to claim 2 and consisting essentially of repeating units represented by the structural formula:

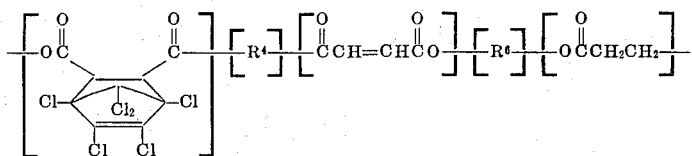

and wherein $R^6$ has from 2 to 6 carbon atoms.

4. A mixture of the polyesteramide of claim 3 and styrene.

5. A glass fiber laminate containing a binding composition comprising the polyesteramide of claim 3.

6. A polyesteramide comprising repeating units represented by the structural formula

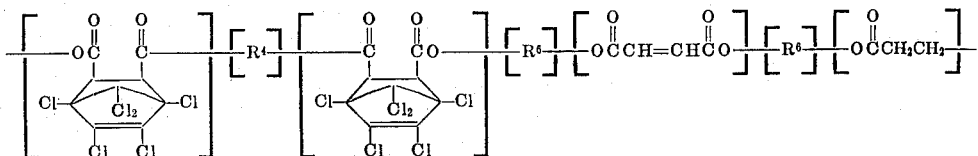

wherein:
$R^1$ is selected from the group consisting of alkylene of up to 15 carbon atoms, arylene of up to 12 carbon atoms, and aralkylene of up to 13 carbon atoms, wherein one or all of the hydrogen atoms thereof can be substituted with one or more members selected from the group consisting of F, Cl, Br, lower alkyl and lower alkoxy;
$R^4$ is aminoalkyleneoxy or oxyalkyleneamino wherein the alkylene portions contain from two to 15 carbon atoms;
$R^5$ is alpha-beta ethylenically unsaturated alkylidene of from two to 34 carbon atoms; and
$R^6$ is alkylene or alkylidene of from two to six carbon atoms.

7. A polyesteramide of claim 6 of the formula

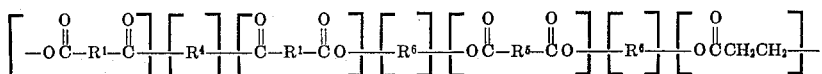

wherein:
$R^1$ is tetrachlorophenylene, tetrabromophenylene or

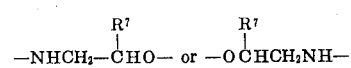

$R^4$ is

—NHCH₂—ĊHO— or —OĊHCH₂NH— wherein $R^7$ is hydrogen or lower alkyl;
$R^5$ is

—CH=Ċ— or —Ċ=CH— wherein $R^8$ is hydrogen or lower alkyl; and
$R^6$ is lower alkylene or lower alkylidene.

8. A polyesteramide of claim 6 consisting essentially of repeating units represented by the structural formula:

wherein:
$R^4$ is

—NHCH₂—ĊHO— or —OĊHCH₂NH— wherein $R^7$ is hydrogen or methyl; and
$R^6$ is lower alkylene or lower alkylidene having from 2 to 6 carbon atoms.

9. A mixture of the polyesteramide of claim 8 and styrene.

10. A glass fiber-reinforced article containing a glass fiber binder composition comprising the polyester of claim 8.

* * * * *